Patented Jan. 31, 1933

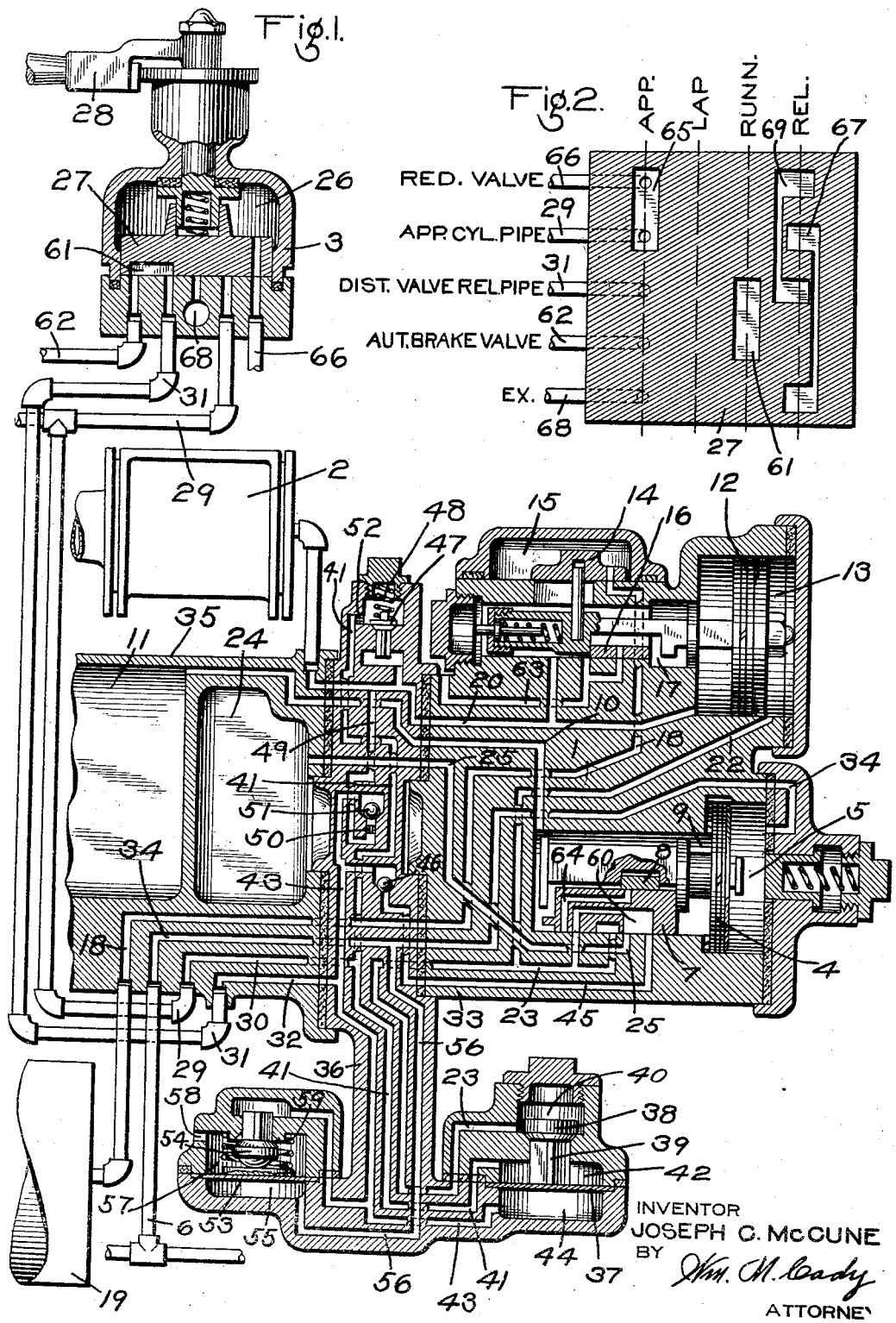

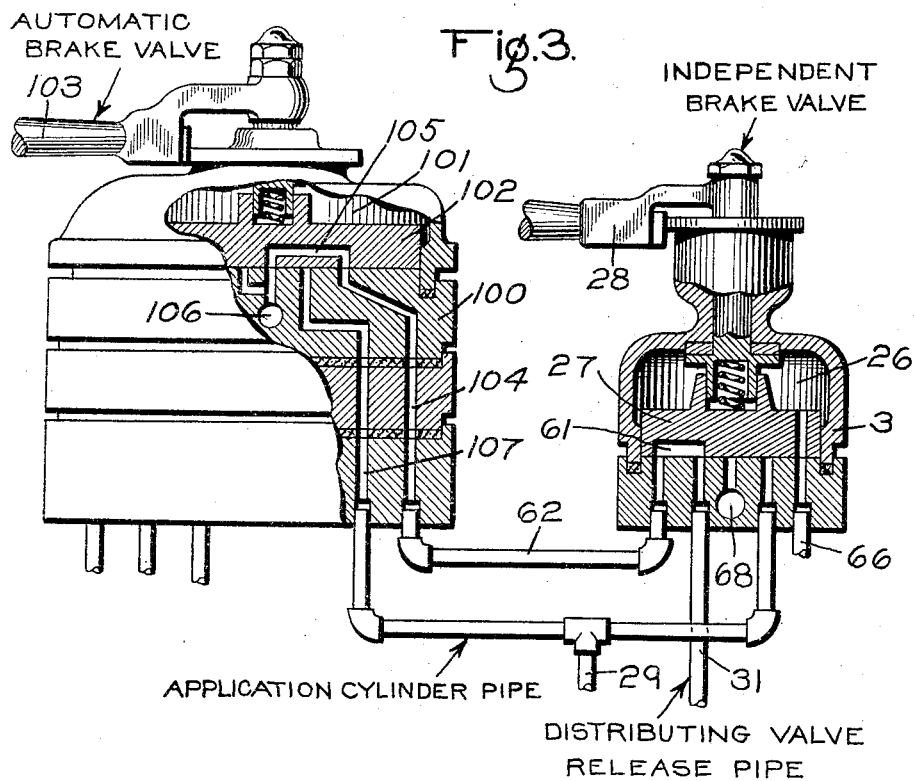

1,895,473

UNITED STATES PATENT OFFICE

JOSEPH C. McCUNE, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE

Application filed June 24, 1929. Serial No. 373,169.

This invention relates to fluid pressure brakes, and more particularly to a locomotive brake apparatus for a fluid pressure brake equipment.

A locomotive brake equipment which is extensively employed on railways and known as the E. T. locomotive brake equipment, includes a distributing valve device, an automatic brake valve device, and an independent brake valve device.

The distributing valve device comprises an equalizing portion and an application and release portion. The application and release portion comprises valves for controlling the admission and release of fluid under pressure to and from the locomotive brake cylinders and a piston operated by the pressure in an application cylinder for operating said valves.

The equalizing valve device comprises valves for controlling the admission and release of fluid under pressure to the application cylinder and a piston operated by variations in brake pipe pressure for operating said valves. An application cylinder pipe is connected to the application cylinder and leads to the independent brake valve, so that the brakes on the locomotive may be independently applied and released on the locomotive by operating the independent brake valve so as to supply fluid under pressure to and release fluid from the application cylinder pipe.

The automatic brake valve is adapted to control the pressure in the brake pipe, to maintain the brake pipe charged with fluid under pressure and to effect an application of the brakes by causing a reduction in brake pipe pressure.

A distributing valve release pipe is also provided, which is connected through a communication controlled by the independent brake valve with the automatic brake valve. The release pipe is connected through the slide valve of the equalizing valve device, when in release position, with the application cylinder so that fluid may be released from the application cylinder to release the locomotive brakes, when the automatic brake valve is turned from release to running position.

When an automatic application of the brakes is effected, the fluid pressure supplied from the usual pressure chamber of the equalizing valve device equalizes into the application cylinder and the application cylinder pipe, and the additional volume of the application cylinder pipe into which the fluid pressure equalizes tends to reduce the pressure obtained in the application cylinder. This effect is of course more pronounced, the greater the length of the application cylinder pipe which may be employed.

If the application cylinder pipe should become cracked or broken, it will be impossible to apply or hold the brakes applied on the locomotive, as will be evident.

One object of my invention is to provide means for ensuring that the brakes will be applied on the locomotive and if applied will be held applied in the event that the application cylinder pipe should become broken.

Another object of my invention is to provide means for preventing the fluid pressure supplied to the application cylinder in applying the brakes from equalizing into the application cylinder pipe.

Other objects and advantages will appear in the following more detailed description of the invention.

In the accompanying drawings: Figure 1 is a diagrammatic view, with the principal parts in section, of a locomotive brake equipment embodying my invention; Fig. 2 a diagram, showing the different positions of the rotary valve of the independent brake valve device, and Fig. 3 a view, partly in section, of the automatic brake valve device associated with the independent brake valve device.

For the sake of clarity, only so much of a locomotive brake equipment is shown as is deemed necessary to a complete understanding of the invention.

The apparatus shown is of the well known type called the E. T. locomotive brake equipment, which includes a distributing valve device 1, a brake cylinder 2, and an independent brake valve device 3, and also an automatic brake valve device which is not shown.

The distributing valve device comprises an equalizing portion and an application and release portion. The equalizing portion comprises a piston 4, contained in piston chamber 5 connected to the usual brake pipe 6, through a passage 34, and a main slide valve 7 and a graduating slide valve 8, contained in valve chamber 9 and adapted to be operated by piston 4, the valve chamber 9 being connected through a passage 10 with a pressure chamber 11.

The application and release portion comprises a piston 12 contained in an application cylinder 13, a supply valve 14, contained in valve chamber 15, and a release valve 16, contained in valve chamber 17. The valve chamber 15 is connected through passage 18 with the usual main reservoir 19, and valve chamber 17 is connected through passage 20 with the brake cylinder 2.

The application cylinder 13 is connected through a passage 22 with a passage 23 which leads to the seat of slide valve 7 and an application chamber 24 is connected to a passage 25, leading to the seat of slide valve 7.

The independent brake valve device 3 comprises a casing having a valve chamber 26, containing a rotary valve 27, adapted to be operating by a handle 28. An application cylinder pipe 29 leads to the seat of rotary valve 27 and is connected to a passage 30 in the distributing valve casing. A distributing valve release pipe 31 also leads to the seat of the rotary valve 27 and is connected to a passage 32 in the distributing valve casing.

Fig. 3 illustrates the usual automatic brake valve associated with the independent brake valve 3, said automatic brake valve device comprising a sectional casing 100 having a valve chamber 101, containing a rotary slide valve 102, adapted to be operated by a handle 103. The pipe 62 is connected to passage 104 leading to the seat of valve 102, and in running position, as shown, the passage 104 is connected, through cavity 105 in the valve 101, with an atmospheric exhaust port 106. The application cylinder pipe 29 is connected to a passage 107, which leads to the seat of valve 102, and in running position, said passage is blanked.

The equalizing portion and the application and release portion are contained in a casing section 33 and the pressure chamber 11 and the application chamber 24 are contained in a casing section 35. Said casing sections are clamped on opposite sides of a casing section 36. In the casing section 36 is disposed an application cylinder cut-off valve device comprising a flexible diaphragm 37 and a valve 38 having a stem 39 adapted to engage said diaphragm.

Passage 23 is connected to valve chamber 40, containing the valve 38 and passage 30, and consequently the application cylinder pipe 29 are connected through passage 41 with chamber 42 at the upper side of diaphragm 37. Passage 32, and consequently the distributing valve release pipe 31, are connected through passage 43 with the chamber 44 at the lower side of diaphragm 37.

A passage 45, leading to the seat of slide valve 7, is connected to passage 43, past a ball check valve 46. The brake cylinder passage 20 is connected through a choke plug 52 having a restricted passage and past a check valve 47, subject to the pressure of a light spring 48, with passage 41. The passage 20 is also connected to a passage 49 and through a choke plug 50 having a restricted port and past a ball check valve 51 with passage 43.

An additional valve device is arranged in the casing section 36 and comprises a flexible diaphragm 53 and a valve 54 adapted to be engaged by said diaphragm. The chamber 55 at the lower side of the diaphragm is connected through passage 56 with the brake pipe passage 34. The valve chamber 57 at the upper side of the diaphragm 53 contains the valve 54 and is open to the atmosphere through port 58 and a light spring 59 in chamber 57 acts on the diaphragm.

In operation, when the brake pipe 6 is charged in the usual manner with fluid under pressure, fluid flows through the usual feed groove around the equalizing piston 4 and charges valve chamber 9 and pressure chamber 11 to the pressure carried in the brake pipe. Brake pipe pressure is also supplied through passage 56 to chamber 55 and deflects the diaphragm 53 upwardly so as to seat the valve 54.

In release position of the equalizing valve device, the application cylinder 13 is connected through passage 22, passage 23, and cavity 60 in slide valve 7, with passage 45, and passage 45 is connected past check valve 46 with passage 43, so that the application cylinder is now connected to the distributing valve release pipe 31. In the normal running position, a cavity 61 in the rotary valve 27 of the independent brake valve 3 connects pipe 31 with a pipe 62 which leads to the seat of the rotary valve 102 of the automatic brake valve device 100. In the normal running position of the automatic brake valve, the distributing valve release pipe is connected to the atmosphere as hereinbefore described.

With the application cylinder 13 at atmospheric pressure, the piston 12 is maintained in release position, in which the release valve 16 connects the valve chamber 17 and consequently the brake cylinder 2 with the atmosphere through passage 63.

An automatic service application of the brakes is effected by operation of the automatic brake valve device to effect a gradual reduction in brake pipe pressure. Upon reducing the brake pipe pressure, the equalizing piston 4 moves to the right, causing the graduating valve 8 to first move and uncover the service port 64 and then the main valve 7 is moved to bring port 64 into registry with passage 23.

Fluid under pressure is now supplied from the valve chamber 9 and the pressure chamber 11 to the application cylinder 13, so that the piston 12 is shifted inwardly to cause the release valve to close the exhaust from the brake cylinder and the supply valve to open communication from the valve chamber 15 and the main reservoir 19 to the valve chamber 17 and the brake cylinder. Fluid under pressure is thus supplied to the brake cylinder to effect an application of the brakes.

It will now be noted that the check valve 38 prevents flow from the passage 23 and the application cylinder 13 to the passage 41 and the application cylinder pipe 29, so that fluid under pressure supplied to the application cylinder by operation of the equalizing valve device cannot equalize into the application cylinder pipe and thus correspondingly reduce the pressure of fluid supplied to the application cylinder.

Furthermore, if the application cylinder pipe should break, the check valve 38 prevents loss of the brake through the release of fluid from the application cylinder to the broken application cylinder pipe.

In order to permit the release of the brakes, fluid under pressure must be released from the application cylinder and this is accomplished after an automatic application of the brakes, when the brake pipe pressure is increased in the usual manner by operation of the automatic brake valve device. The equalizing piston 4 is then shifted to release position and the slide valve 7 is thereby moved to release position, in which the application cylinder 13 is connected through passage 23 and cavity 60 in slide valve 7 with passage 45 which is connected to the distributing valve release pipe 31. The independent brake valve device 3 being in running position, as shown, and the automatic brake valve device being in running position, the distributing valve release pipe is connected to the atmosphere, through ports in the automatic brake valve device.

Fluid under pressure is therefore released from the application cylinder 13 and the piston 12 is then moved to release position, in which the slide valve 16 again connects the valve chamber 17 and the brake cylinder 2 with the atmosphere.

In order to make an independent application of the brakes on the locomotive, the independent brake valve handle 28 is turned to application position, in which a cavity 65 in the rotary valve 27 connects the application cylinder pipe 29 with a pipe 66 which is connected to a reducing valve device (not shown) adapted to supply fluid at a reduced pressure from the main reservoir.

Fluid under pressure is thus supplied to the application cylinder pipe 29 and flows through passages 30 and 41 to chamber 42 of the cut-off valve device. The check valve 38 is then lifted to permit flow of passage 23 and the application cylinder 13, so that the piston 12 is operated to shift the valve 14 and cause the supply of fluid under pressure to the brake cylinder to effect an independent application of the brakes on the locomotive.

To release the brakes after an independent application, the independent brake valve handle is turned to release position, in which the application cylinder pipe 29 is connected, through a cavity 67 in the rotary valve 27 with exhaust port 68. However, as so far described, the release of fluid from the application cylinder 13 is prevented by the check valve 38.

In order to effect the release, the diaphragm 37 is provided and in release position of the independent brake valve device, the distributing valve release pipe 31 is connected, through a cavity 69 in the rotary valve 27 with the reducing valve pipe 66, so that fluid under pressure is supplied to said pipe.

Fluid supplied to the distributing valve release pipe 31 flows through passage 32 and passage 43 to chamber 37 below the diaphragm 37 and the diaphragm is thus deflected upwardly so as to unseat the check valve 38.

This establishes communication from passage 23 and the application cylinder 13 to passage 41 and the application cylinder pipe 29, so that the application cylinder pipe being connected to the atmosphere in the release portion of the independent brake valve, fluid under pressure will be released from the application cylinder, so that the release of the brakes is effected.

Provision is made in the E. T. locomotive brake equipment for holding the brakes on the locomotive applied while releasing the brakes on the train and this is accomplished by moving the automatic brake valve to release position, in which the brake pipe pressure is increased to effect the movement of the triple valve devices on the train to release position as well as the equalizing valve device on the locomotive. The automatic brake valve device is then turned to holding position, in which the distributing valve release pipe is lapped, so that fluid under pressure will not be released from said pipe.

In release position of the equalizing slide valve 7, the application cylinder 13 is connected through passage 23 and cavity 60 in the slide valve 7 with passage 45 and the distributing valve release pipe 31 and consequently, fluid in the application cylinder 13 equalizes into the distributing valve release pipe and tends to release the brakes when it is desired to hold the brakes applied.

In order to prevent this, means are provided for charging the distributing valve release pipe 31 with fluid under pressure supplied from the brake cylinder. It will now be noted that when fluid is supplied to the brake cylinder, fluid also flows through passage 49 and choke plug 50, past the choke valve 51 to passage 43 and that consequently the distributing valve release pipe is charged with fluid from the brake cylinder when the brakes are applied, so that when it is desired to hold the locomotive brakes applied while releasing the train brakes, the release pipe being charged to a pressure corresponding with that in the application cylinder 13, there will be no reduction in pressure in the application cylinder by equalization into the release pipe.

The fluid pressure thus supplied to the release pipe also acts in the diaphragm chamber 44 and tends to unseat the check valve 38 which would then permit flow of fluid from the application cylinder to the application cylinder pipe 29, so that the pressure in the application cylinder would be reduced by equalization into the application cylinder pipe, or if the application cylinder pipe should break, the fluid pressure in the application cylinder would be entirely lost.

In order to prevent this, fluid under pressure is also supplied to the application cylinder pipe from the brake cylinder. For this purpose, the check valve 47 is provided, so that in applying the brakes, fluid under pressure is supplied from the brake cylinder passage 20, past check valve 47 and through the choke plug 52 to passage 41 and the application cylinder pipe 29.

From passage 41, fluid flows to the diaphragm chamber 42 and consequently, in applying the brakes, fluid under pressure from the brake cylinder is supplied to opposite sides of the diaphragm 37, and consequently, the diaphragm is not deflected by fluid supplied to the release pipe 31 and therefore the check valve 38 remains seated.

When fluid under pressure is supplied to the release pipe 31, the check valve 46 prevents flow to passage 45 and thence through the equalizing slide valve 7 to the application cylinder 13. If such flow were permitted, it would tend to prevent the release of the brakes, to the extent that the pressure in the application cylinder might be built up by such flow.

If the application cylinder pipe should break after an independent or automatic application of the brakes, fluid under pressure will be trapped in the distributing valve release pipe and this pressure will not be balanced on the diaphragm 37 by fluid pressure supplied to the diaphragm chamber 42, since the fluid pressure in chamber 42 will escape through the broken application cylinder pipe.

The fluid pressure trapped in chamber 44 will therefore deflect the diaphragm 37 so as to open the check valve 38 and thus permit escape of fluid from the application cylinder 13.

In order to prevent the above, the valve device having the diaphragm 53 is provided. Fluid under pressure is supplied from the brake pipe to chamber 55 and normally deflects the diaphragm 53 so as to hold the valve 54 seated. Chamber 57 is open to the atmosphere and the parts are so arranged that the diaphragm 53 will not move downwardly until the brake pipe pressure has been reduced to a predetermined low degree, such as thirty-five pounds, for example.

If the application cylinder pipe should break, the engineer can prevent the loss of fluid from the application cylinder by making an emergency reduction in brake pipe pressure and when the brake pipe pressure has thus been reduced to a predetermined low degree, the diaphragm 53 will move downwardly and permit the valve 54 to unseat.

Passage 43 and consequently the distributing valve release pipe 31 are now connected to the atmospheric port 58 and therefore fluid under pressure in chamber 44 is vented to the atmosphere. The diaphragm 37 is thus permitted to move downwardly, so that the valve 38 will seat and therefore permit the pressure in the application cylinder to build up.

The choke plugs 50 and 52 are employed, so as to limit the flow of fluid from the brake cylinder to the application cylinder pipe and the distributing valve release pipe, so that if either of these pipes should become broken, the flow of fluid to the atmosphere will be at a restricted rate, and thus the loss of fluid under pressure will not be excessive.

It will now be seen that the check valve 38 prevents back flow from the application cylinder 13 to the application cylinder pipe 29, so that fluid under pressure cannot equalize from the application cylinder back to the application cylinder pipe and thus correspondingly reduce the pressure of fluid supplied to the application cylinder. The check valve 38 also prevents loss of the brake in case the application cylinder pipe should break.

In order to effect the release of the brakes, fluid under pressure is supplied by operation of the independent brake valve to the diaphragm 37, which operates to unseat the check valve 38, so that fluid can now be released from the application cylinder 13 to the application cylinder pipe 29.

In order to prevent equalization of fluid under pressure into the distributing valve release pipe 31, the distributing valve release pipe is charged with fluid under pressure supplied to the brake cylinder, so that when it is desired to hold the locomotive brakes applied while releasing the train brakes, the release pipe being charged to a pressure corresponding with that in the application cylinder 13, there will be no reduction in pressure in the application cylinder by equalization into the release pipe.

Fluid under pressure supplied to the release pipe acts on diaphragm 37 and tends to unseat check valve 38 so as to prevent flow from the application cylinder to the cylinder pipe 29. In order to prevent this, fluid under pressure is also supplied to the application cylinder pipe from the brake cylinder past check valve 47, so that fluid at brake cylinder pressure is supplied to opposite sides of the diaphragm 37 and therefore the diaphragm 37 is not deflected by fluid supplied to the release pipe 31 under the conditions referred to.

If the application cylinder pipe should break, the engineer can prevent loss of fluid from the application cylinder by making an emergency reduction in brake pipe pressure, so as to operate the diaphragm 53 and permit valve 54 to unseat. The release pipe 31 is thus connected to the atmosphere, so that the diaphragm 37 can move downwardly and permit valve 38 to seat. The pressure in the application cylinder 13 can then be built up, without permitting escape past the check valve 38.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder and brake pipe, of an application valve device operated upon an increase in fluid pressure for supplying fluid under pressure to the brake cylinder, an equalizing valve device operated upon a reduction in brake pipe pressure for supplying fluid under pressure to said application valve device, a brake valve device for also supplying fluid under pressure to said application valve device, and a check valve for preventing back flow of fluid from said application valve device to said brake valve device.

2. In a fluid pressure brake, the combination with a brake cylinder, of a valve device operated by variations in fluid pressure for controlling the supply of fluid under pressure to the brake cylinder and having a passage through which fluid under pressure is supplied to said valve device, a check valve for normally preventing back flow from said valve device through said passage, and means for operating said check valve to open communication for permitting back flow through said passage in releasing the brakes.

3. In a fluid pressure brake, the combination with a brake cylinder, of a valve device operated by variations in fluid pressure for controlling the supply of fluid under pressure to the brake cylinder and having a passage through which fluid under pressure is supplied to said valve device, a check valve for normally preventing back flow from said valve device through said passage, and a movable abutment operated by fluid pressure for opening said check valve upon releasing the brakes.

4. In a fluid pressure brake, the combination with a brake cylinder, of a valve device operated by variations in fluid pressure for controlling the supply of fluid under pressure to the brake cylinder and having a passage through which fluid under pressure is supplied to said valve device, a check valve for normally preventing back flow from said valve device through said passage, a movable abutment operated by fluid pressure for opening said valve, and means operated upon releasing the brakes for supplying fluid pressure to said abutment.

5. In a fluid pressure brake, the combination with a brake cylinder, of a valve device operated upon an increase in fluid under pressure for supplying fluid under pressure to the brake cylinder and having a passage through which fluid under pressure is released from said valve device and a check valve for preventing flow of fluid through said passage to said valve device.

6. In a fluid pressure brake, the combination with a brake cylinder, of a distributing valve device having an application portion operated by an increase in fluid pressure for supplying fluid under pressure to the brake cylinder, a distributing valve release pipe through which fluid under pressure is released from said application portion, and a check valve for preventing flow of fluid under pressure from said pipe to said application portion.

7. In a fluid pressure brake, the combination with a valve device operated upon an increase in fluid pressure for applying the brakes and upon a reduction in fluid pressure for releasing the brakes, an application pipe through which fluid under pressure is supplied to said valve device, a release pipe through which fluid under pressure is released from said valve device, a check valve for preventing back flow from said valve device to said application pipe, and means operated by an increase in fluid pressure in said release pipe for opening said valve.

8. In a fluid pressure brake, the combination with a valve device operated upon an increase in fluid pressure for applying the brakes and upon a reduction in fluid pressure for releasing the brakes, a release pipe through which fluid under pressure is released from said valve device, means for supplying fluid under pressure to said pipe upon applying the brakes, and a check valve for preventing flow of fluid under pressure from said pipe to said valve device.

9. In a fluid pressure brake, the combination with a brake cylinder, of a valve device operated upon an increase in fluid pressure for supplying fluid under pressure to the brake cylinder, a release pipe through which fluid under pressure is released from said valve device, a passage through which fluid under pressure is supplied to said release pipe, and a check valve for preventing back flow from said release pipe to the brake cylinder.

10. In a fluid pressure brake, the combination with a brake cylinder, of a valve device operated upon an increase in fluid pressure for supplying fluid under pressure to the brake cylinder, an application pipe through which fluid under pressure is supplied to said valve device, and a passage through which fluid under pressure is supplied from the brake cylinder to said pipe.

11. In a fluid pressure brake, the combination with a brake cylinder, of a valve device operated upon an increase in fluid pressure for supplying fluid under pressure to the brake cylinder, an application pipe through which fluid under pressure is supplied to said valve device, a passage through which fluid under pressure from the brake cylinder is supplied to said pipe, and a check valve for preventing back flow from said pipe to the brake cylinder.

12. In a fluid pressure brake, the combination with a brake cylinder, of a valve device operated upon an increase in fluid pressure for supplying fluid under pressure to the brake cylinder, a release pipe through which fluid under pressure is released from said valve device, an application pipe through which fluid under pressure is supplied to said valve device, and means for supplying fluid under pressure from the brake cylinder to said pipes in applying the brakes.

13. In a fluid pressure brake, the combination with a brake cylinder, of a valve device operated upon an increase in fluid pressure for supplying fluid under pressure to the brake cylinder, a release pipe through which fluid under pressure is released from said valve device, an application pipe through which fluid under pressure is supplied to said valve device, means for supplying fluid under pressure to said pipes upon applying the brakes, and check valves for preventing back flow from said pipes to the brake cylinder.

14. In a locomotive brake equipment, the combination with a brake pipe and brake cylinder, of a brake controlling valve device for controlling the supply and release of fluid under pressure to and from the brake cylinder and operated by variations in pressure in an application cylinder, an equalizing valve device operated upon a reduction in brake pipe pressure for supplying fluid under pressure to said cylinder, a release pipe through which fluid is released from said cylinder, communication from said cylinder through said pipe being controlled by said equalizing valve device, an independent brake valve for also controlling communication through said pipe, and a check valve for preventing flow of fluid from said pipe to said cylinder.

15. In a locomotive brake equipment, the combination with a brake pipe and brake cylinder, of a valve device operated upon an increase in fluid pressure for supplying fluid under pressure to the brake cylinder, a release pipe through which fluid under pressure is released from said valve device, and a valve device subject to brake pipe pressure and operated upon a predetermined reduction in brake pipe pressure for connecting said pipe to the atmosphere.

16. In a locomotive brake equipment, the combination with a brake pipe and brake cylinder, of a valve device operated upon an increase in fluid pressure for supplying fluid under pressure to the brake cylinder, a release pipe through which fluid under pressure is released from said valve device, and a valve device subject to brake pipe pressure and operated upon a predetermined reduction in brake pipe pressure for venting fluid from said pipe.

17. In a locomotive brake equipment, the combination with a brake pipe, of a valve device having an application cylinder and operated by variations in fluid pressure for controlling the brakes, an application cylinder pipe, a check valve for normally preventing back flow from said cylinder to said pipe, a release pipe, and means operated upon an increase in fluid pressure in said release pipe for opening said check valve.

18. In a locomotive brake equipment, the combination with a brake pipe, of a valve device having an application cylinder and operated by variations in fluid pressure for controlling the brakes, an application cylinder pipe, a check valve for normally preventing back flow from said cylinder to said pipe, a release pipe, means operated upon an increase in fluid pressure in said release pipe for opening said check valve to permit release of fluid under pressure from said cylinder through said application cylinder pipe, and means operated upon a predetermined reduction in brake pipe pressure for venting fluid from said release pipe.

19. In a locomotive brake equipment, the combination with a brake pipe, of a valve device having an application cylinder and operated by variations in fluid pressure for controlling the brakes, an application cylinder pipe, a check valve for normally preventing back flow from said cylinder to said pipe, a release pipe, means operated upon an increase in fluid pressure in said release pipe for opening said check valve to permit release of fluid under pressure from said cylinder through said application cylinder pipe, means operated under a predetermined reduction in brake pipe pressure for venting fluid under pressure from said release pipe, and a brake valve device for controlling the supply of fluid under pressure to said release pipe.

20. In a locomotive brake equipment, the combination with a brake pipe, of a valve device having an application cylinder and operated by variations in fluid pressure for controlling the brakes, an application cylinder pipe, a check valve for normally preventing back flow from said cylinder to said pipe, a release pipe, means operated upon an increase in fluid pressure in said release pipe for opening said check valve to permit release of fluid under pressure from said cylinder through said application cylinder pipe, means operated upon a predetermined reduction in brake pipe pressure for venting fluid under pressure from said release pipe, and a brake valve device for controlling the supply of fluid under pressure to said release pipe and the supply of fluid under pressure to said application cylinder pipe.

21. In a locomotive brake equipment, the combination with a brake pipe, of a valve device having an application cylinder and operated by variations in fluid pressure for controlling the brakes, an application cylinder pipe, a check valve for normally preventing back flow from said cylinder to said pipe, a release pipe, means operated upon an increase in fluid pressure in said release pipe for opening said check valve to permit release of fluid under pressure from said cylinder through said application cylinder pipe, means operated upon a predetermined reduction in brake pipe pressure for venting fluid under pressure from said release pipe, and a brake valve device for controlling the supply of fluid under pressure to said release pipe and the supply and release of fluid under pressure to and from said application cylinder pipe.

22. In a locomotive brake equipment, the combination with a brake cylinder, of a valve device operated upon an increase in fluid pressure in an application cylinder for supplying fluid under pressure to the brake cylinder, an application cylinder pipe through which fluid under pressure is supplied to said cylinder, a check valve for preventing back flow from said cylinder to said pipe, a release pipe, means operated upon an increase in fluid pressure in said release pipe for opening said check valve, and a brake valve device having a position in which the application cylinder pipe is connected to the atmosphere and the release pipe is supplied with fluid under pressure.

In testimony whereof I have hereunto set my hand, this 21st day of June, 1929.
JOSEPH C. McCUNE.